US011820282B2

(12) United States Patent
Mimura et al.

(10) Patent No.: US 11,820,282 B2
(45) Date of Patent: Nov. 21, 2023

(54) NOTIFICATION APPARATUS, VEHICLE, NOTIFICATION METHOD, AND STORAGE MEDIUM

(71) Applicant: HONDA MOTOR CO., LTD., Tokyo (JP)

(72) Inventors: Yoshitaka Mimura, Wako (JP); Morimichi Nishigaki, Wako (JP); Shunsuke Iwao, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/675,651

(22) Filed: Feb. 18, 2022

(65) Prior Publication Data

US 2022/0305984 A1 Sep. 29, 2022

(30) Foreign Application Priority Data

Mar. 26, 2021 (JP) .................................. 2021-053604

(51) Int. Cl.
  *B60Q 1/38* (2006.01)
  *B60Q 1/30* (2006.01)
  *B60Q 1/04* (2006.01)
  *B60Q 1/50* (2006.01)

(52) U.S. Cl.
  CPC ................. *B60Q 1/38* (2013.01); *B60Q 1/04* (2013.01); *B60Q 1/30* (2013.01); *B60Q 1/543* (2022.05)

(58) Field of Classification Search
  CPC ... B60Q 1/50; B60Q 1/04; B60Q 1/30; B60Q 1/38; B60Q 1/543
  See application file for complete search history.

(56) References Cited

U.S. PATENT DOCUMENTS

| 2016/0023589 A1* | 1/2016 | Warner | B60Q 1/0035 315/77 |
| 2018/0218611 A1* | 8/2018 | Nagura | B60Q 3/70 |
| 2019/0366914 A1* | 12/2019 | Ochida | B60Q 1/543 |

FOREIGN PATENT DOCUMENTS

| EP | 3858672 A1 | | 8/2021 |
| JP | 2013-141953 A | | 7/2013 |
| JP | 2013141953 A | * | 7/2013 |
| JP | 2020-055519 A | | 4/2020 |

OTHER PUBLICATIONS

Japanese Office Action for Japanese Patent Application No. 2021-053604 dated Aug. 19, 2022 (partially translated).

* cited by examiner

*Primary Examiner* — Mohamed Barakat
(74) *Attorney, Agent, or Firm* — Thomas | Horstemeyer, LLP

(57) ABSTRACT

The present invention provides a notification apparatus that is mounted on a vehicle and notifies surroundings of the vehicle that the vehicle is starting, the notification apparatus comprising: a detector configured to detect a driver's intention to start the vehicle; and a lighting controller configured to cause, when the detector detects the driver's intention to start the vehicle, a lighting device in the vehicle to light in a predetermined lighting mode.

14 Claims, 5 Drawing Sheets

NOTIFICATION APPARATUS, VEHICLE, NOTIFICATION METHOD, AND STORAGE MEDIUM

CROSS-REFERENCE TO RELATED APPLICATION(S)

This application claims priority to and the benefit of Japanese Patent Application No. 2021-053604 filed on Mar. 26, 2021, the entire disclosure of which is incorporated herein by reference.

BACKGROUND OF THE INVENTION

Field of the Invention

The present invention relates to a notification apparatus that notifies the surroundings of a vehicle that the vehicle is starting and also relates to a vehicle, a notification method, and a storage medium.

Description of the Related Art

For safety reasons, upon starting, vehicles preferably notify their surroundings that they are starting. Japanese Patent Laid-Open No. 2020-55519 discloses a technique in which, upon starting, a vehicle draws an optical start notification display having a predetermined shape on a running-side road surface.

The technique described in Japanese Patent Laid-Open No. 2020-55519 may be disadvantageous in terms of vehicle cost because a device that draws an optical start notification display on a road surface needs to be mounted on a vehicle.

SUMMARY OF THE INVENTION

The present invention provides a technique that advantageously notifies the surroundings of a vehicle that the vehicle is starting, for example, with a simple configuration.

According to one aspect of the present invention, there is provided a notification apparatus that is mounted on a vehicle and notifies surroundings of the vehicle that the vehicle is starting, the notification apparatus comprising: a detector configured to detect a driver's intention to start the vehicle; and a lighting controller configured to cause, when the detector detects the driver's intention to start the vehicle, a lighting device in the vehicle to light in a predetermined lighting mode.

Further features of the present invention will become apparent from the following description of exemplary embodiments with reference to the attached drawings.

DESCRIPTION OF THE EMBODIMENTS

Figure 1:
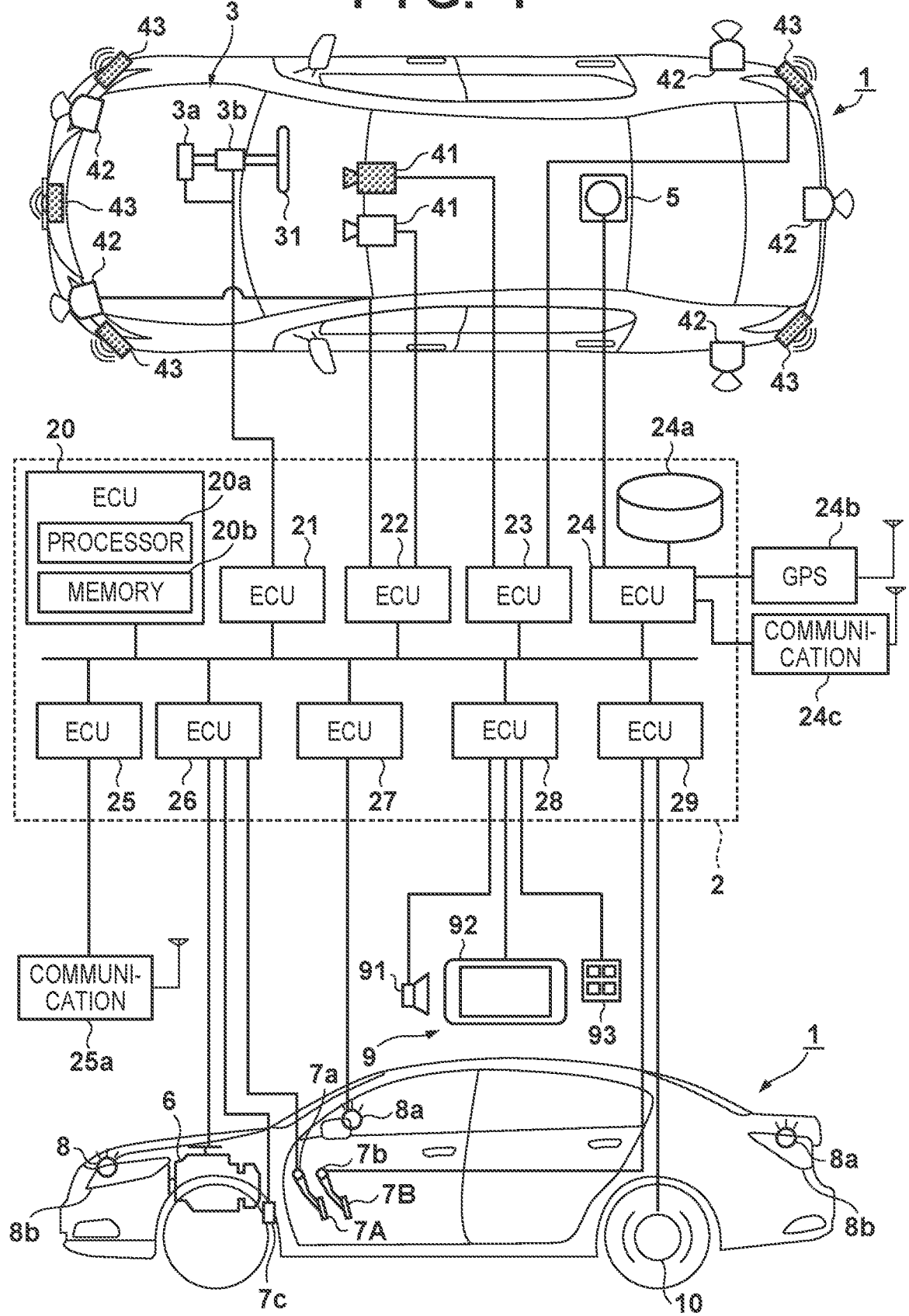
FIG. 1 is a block diagram of an example configuration of a control device in a vehicle.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

A notification device (notification apparatus) according to a first embodiment of the present invention will be described below. The notification device according to the present invention is a device that is mounted on a vehicle and notifies the surroundings of the vehicle that the vehicle is starting. Hereinafter, a four-wheeled vehicle will be described as an example of a vehicle in which the notification device according to the present invention is mounted. However, it should be noted that the notification device according to the present invention can be mounted on other types of vehicles, such as straddle type vehicles (e.g., motorcycles and tricycles).

With reference to FIG. 1, an overall control system of a vehicle 1 will be described below. FIG. 1 is a block diagram of an example configuration of a control device 2 in a vehicle 1. FIG. 1 illustrates the outlines of the top and a side of a sedan-type four-wheeled passenger vehicle, which is an example of the vehicle 1.

The control device 2 controls some sections in the vehicle 1. The control device 2 includes a plurality of electronic control units (ECUs) 20 to 29 that are communicably interconnected via an in-vehicle network. Each of the ECUs includes a processor represented by a CPU, a storage device such as a semiconductor memory, and an interface with an external device. The storage device stores programs to be executed by the processor, data to be used by the processor for processing, and the like. Each ECU may include a plurality of processors, storage devices, interfaces, and the like. For example, the ECU 20 includes a processor 20a and a memory 20b. The processor 20a executes commands included in a program stored in the memory 20b, thereby the processing by the ECU 20 is executed. Alternatively, the ECU 20 may include a dedicated integrated circuit, such as an application-specific integrated circuit (ASIC), that performs processing by the ECU 20. Such configurations may also be applied to the other ECUs.

Functions and other features of the ECUs 20 to 29 will be described below. It should be noted that the number of ECU and the function thereof can be designed as appropriate, and the ECU can be further subdivided or integrated as compared to the case of the present embodiment.

The ECU 20 performs overall control of the vehicle 1 (self-vehicle) according to the present embodiment. The ECU 20 may be configured to perform the control of automated driving of the vehicle 1. In this case, the ECU 20 may automatically control at least one of the steering and speed (acceleration or deceleration) of the vehicle 1.

The ECU 21 controls an electric power steering device 3. The electric power steering device 3 includes a mechanism for steering the front wheels in accordance with a driver's driving operation (steering operation) on a steering wheel 31. In addition, the electric power steering device 3 includes:

a motor 3a that generates driving force for assisting the steering operation or automatically steering the front wheels; and a steering angle sensor 3b that detects a steering angle. When the vehicle 1 is running (traveling) in an automated driving mode, the ECU 21 automatically controls the electric power steering device 3 in response to an instruction from the ECU 20, thereby controlling the running direction of the vehicle 1.

The ECUs 22 and 23 control detection units 41 to 43 that detect situations surrounding the vehicle and perform information processing of the detection results. Each of the detection units 41 is an imaging device that periodically captures images of the surroundings of the vehicle 1. Hereinafter, each detection unit 41 is sometimes referred to as the camera 41. In the present embodiment, the cameras 41 are installed on the inner side of the windshield and in a front portion of the roof of the vehicle 1 so as to be able to capture images of front sights from the vehicle 1. The analysis (image processing) of the images captured by the cameras 41 makes it possible to analyze an object, such as a traffic signal, positioned in front of the vehicle 1 and to extract the display of the traffic signal and a marking line (e.g., white line) of a lane on a road.

Each of the detection units (LIDAR detection units) 42, which is light detection and ranging (LIDAR), detects an object in the surroundings of the vehicle 1 and measures a distance to the object with light. Hereinafter, each detection unit 42 is sometimes referred to as the LIDAR 42. In the present embodiment, five LIDARs 42 are installed, one at each corner of the front portion, one at the center in a rear portion, and one each on both sides in the rear portion of the vehicle 1. Each of the detection units (radar detection units) 43, which is a millimeter-wave radar, detects an object surrounding the vehicle 1 and measure a distance to the detected object with radio waves. Hereinafter, each detection unit 43 is sometimes referred to as the radar 43. In the present embodiment, five radars 43 are installed in the vehicle 1; one is installed on the front center, two are installed at the respective front corners, and one is installed at respective rear corners.

The ECU 22 controls one of the cameras 41 and each LIDAR 42, and performs information processing of the detection results. The ECU 23 controls the other camera 41 and each radar 43, and performs information processing of the detection results. Installing two pairs of devices that detect the situations surrounding the vehicle can provide the detection results with improved reliability. Moreover, installing different types of detection units, such as cameras, LIDARs, and radars, can provide multifaceted analyses of the surroundings of the vehicle.

The ECU 24 controls a gyro sensor 5, a global positioning system (GPS) sensor 24b, and a communication device 24c, and performs information processing of the detection results or communication results. The gyro sensor 5 detects a rotational movement of the vehicle 1. The detection result of the gyro sensor 5, the wheel speeds, or the like can be used to determine the route of the vehicle 1. The GPS sensor 24b detects a current position of the vehicle 1. The communication device 24c wirelessly communicates with a server that provides map information and traffic information, thereby acquiring such information therefrom. In addition, the ECU 24 can access a database 24a containing map information which is formed in a storage device and then search for a route from the current position to a destination, for example. The database 24a may be formed on a network, so that the communication device 24c can access the database 24a via the network, thereby acquiring information therefrom.

The ECU 25 includes a communication device 25a that can conduct vehicle-to-vehicle communication or road-to-vehicle communication or that can communicate with an information processing device, such as a smartphone. For example, the communication device 25a can wirelessly communicate with another vehicle positioned nearby, perform information exchange between vehicles, or perform information exchange by wirelessly communicating with an external information processing device or the like.

The ECU 26 controls a power plant 6. The power plant 6 is a mechanism that outputs driving force for rotating the driving wheels of the vehicle 1 and includes an engine and a transmission, for example. However, it should be noted that the configuration of the power plant 6 is not limited to this example configuration. The power plant 6 may include an electric vehicle equipped with an electric motor as a power source and a hybrid vehicle equipped with an engine and an electric motor. Of these examples, the electric vehicle is driven by electric power discharged from a battery, such as a secondary battery, a hydrogen fuel cell, a metal fuel cell, or an alcohol fuel cell, for example.

For example, the ECU 26 controls the output of the engine in accordance with a driver's driving operation (operation on accelerator or acceleration operation) that is detected by an operation detection sensor 7a disposed on an accelerator pedal 7A and switches between the gear ratios of the transmission, based on information such as the vehicle speed detected by the vehicle speed sensor 7c. When the vehicle 1 is running in the automated driving mode, the ECU 26 automatically controls the power plant 6 in accordance with an instruction from the ECU 20, thereby controlling the vehicle speed (speed and acceleration or deceleration of the vehicle 1).

The ECU 27 controls direction indicators 8a (turn signals) and lighting devices 8b (headlights, taillights, etc.). In the example of FIG. 1, the direction indicators 8a are installed in a front portion, at door mirrors and in a rear portion of the vehicle 1. The lighting devices 8b include headlights (headlamps), width lamps (small lamps), taillights (tail lamps), fog lamps, and the like. The lighting devices 8b may be used as daytime traveling lights that light during daytime or as nighttime traveling lights that light after sunset.

The ECU 28 controls an input and output (I/O) device 9. The I/O device 9 outputs information to passengers, including a driver, and receives the input of information from the passengers. A sound output device 91 notifies the passengers of information with sound. A display device 92 notifies the driver of information with displayed images. For example, the display device 92 is installed in front of a driver's seat and a front passenger seat, for example, and includes a touch-panel instrument screen that functions as a human-machine interface, and the like. An input device 93, which is installed such that the driver can operate it, includes: a switch group in which the driver inputs instructions for the vehicle 1; and a sound input device in which the voice of passengers is input.

For example, the ECU 28 performs display control in such a way that the display device 92 displays road information, the road information being acquired from location information regarding the vehicle 1 (self-vehicle) and map information and containing a plurality of lanes on which the vehicle 1 is currently running along the route from the current position to the destination which the ECU 24 has searched for. Furthermore, the ECU 28 causes both the sound output device 91 and the display device 92 to provide the driver with sound, map display, and audio guidance information. In this case, the sound and the display are given as an example; however, information may be notified with vibration or light. In addition, some of sound, display, vibration, and light may be used in combination to notify information. Furthermore, the combination or the notification mode may be changed in accordance with the level (e.g., degree of urgency) of information to be notified.

The ECU 29 controls a brake device 10 and a parking brake (not illustrated). The brake device 10 is a disc brake device, for example, and is installed in each wheel of the vehicle 1. The brake device 10 applies a resistance to the rotation of a wheel, thereby decelerating or stopping the running vehicle 1. The ECU 29 controls the actuation of the brake device 10 in accordance with the driver's driving operation (brake operation) that has been detected by an operation detection sensor 7b installed on a brake pedal 7B, for example. When the vehicle 1 is running in the automated driving mode, the ECU 29 automatically controls the brake device 10 in response to an instruction from the ECU 20 and controls the deceleration and stop of the running vehicle 1. The brake device 10 and the parking brake can also operate to maintain the vehicle 1 in the stopped state. If the transmission of the power plant 6 has a parking lock mechanism, the parking lock mechanism may also operate to maintain the vehicle 1 in the stopped state.

[Configuration of Notification Device]

Figure 2:
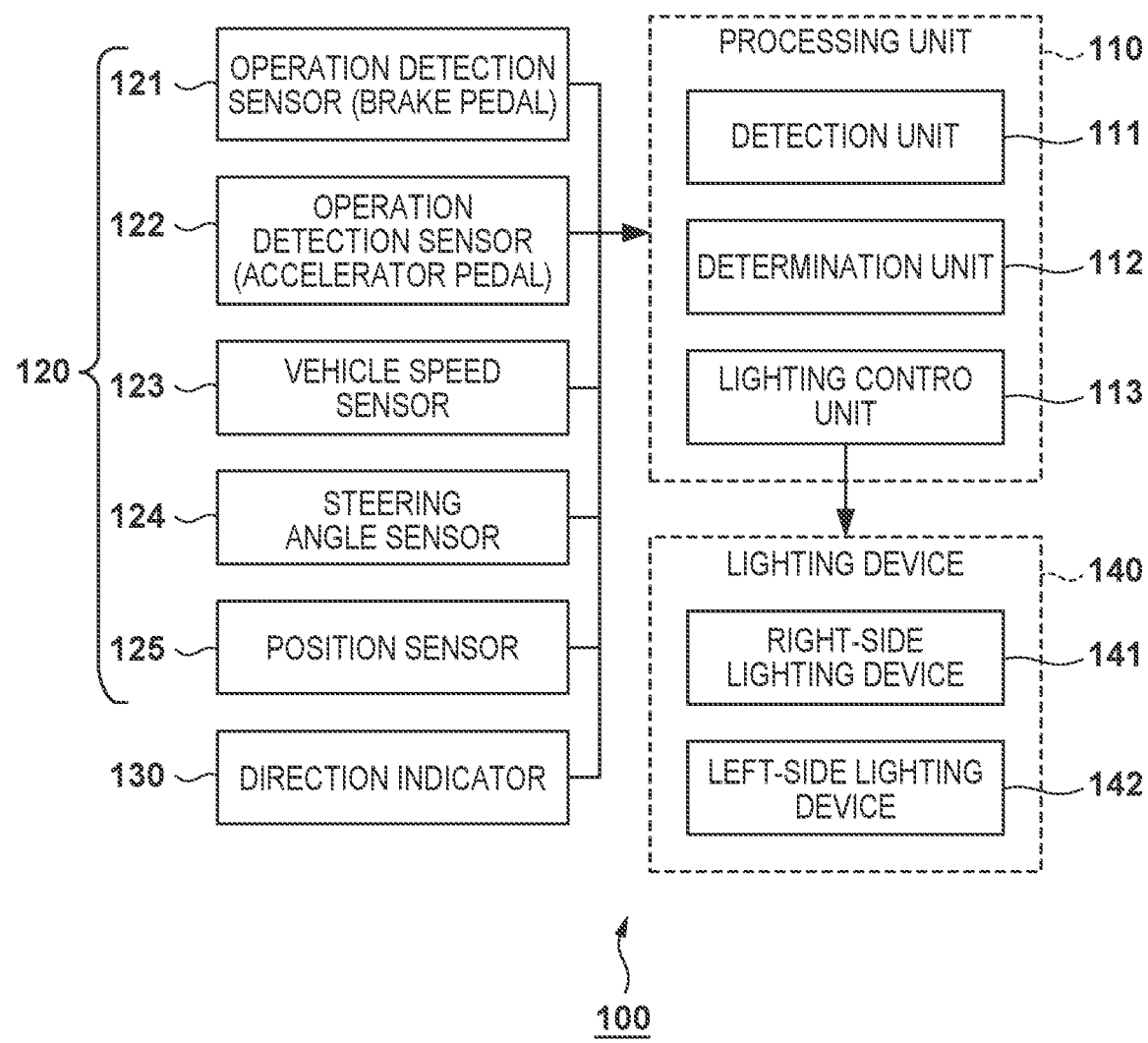
FIG. 2 is a block diagram of an example configuration of a notification device.

Next, with reference to FIG. 2, a description will be given below of an example configuration of a notification device 100 according to the present embodiment. FIG. 2 is a block diagram of an example configuration of the notification device 100 according to the present embodiment. As described above, the notification device 100 is a device that notifies the surroundings of the vehicle 1 that the vehicle 1 is starting. For example, the notification device 100 may include a processing unit 110, a sensor group 120, a direction indicator 130, and a lighting device 140.

The processing unit 110, which corresponds to the control device 2 (ECUs 20 to 29) in FIG. 1, for example, may be formed of a computer that includes a processor represented by a CPU, a storage device such as a semiconductor memory, and an interface with an external device. In the present embodiment, the storage device stores a program for use in notifying the surroundings of the vehicle 1 that the vehicle 1 is starting. Hereinafter, this program is sometimes referred to as the notification program. The processor may execute commands contained in the notification program, causing the processing unit 110 to execute notification processing by which the surroundings of the vehicle 1 are notified that the vehicle 1 is starting. In addition, the processing unit 110 according to the present embodiment may include a detection unit 111, a determination unit 112, and a lighting control unit 113.

The detection unit 111, which corresponds to both the ECU 26 and the ECU 29 in FIG. 1, for example, detects a driver's intention to start the vehicle 1. More specifically, the detection unit 111 can detect a driver's intention to start the vehicle 1, based on an output from an operation detection sensor 121 and/or an output from an operation detection sensor 122; details of the operation detection sensors 121 and 122 will be described later. The intention to start the vehicle 1 refers to signals sent by a driver when he/she is starting the vehicle 1. These signals may include a driver's motion for starting the vehicle 1 and/or a driver's operation on the vehicle 1.

The determination unit 112, which corresponds to the ECU 21, the ECU 24, the ECU 26, and the ECU 27 in FIG. 1, for example, determines a current state of the vehicle 1. More specifically, the determination unit 112 determines a current state of vehicle 1, based on an output from a vehicle speed sensor 123, an output from a steering angle sensor 124, and/or an output from a position sensor 125. Details of the vehicle speed sensor 123, the steering angle sensor 124, and the position sensor 125 will be described later. In addition, the determination unit 112 determines current lighting states of the direction indicators 130 (turn signals), based on an input signal to the direction indicators 130 and/or output signal from the direction indicators 130. The direction indicators 130, which correspond to the direction indicators 8a in FIG. 1, are installed on both (right and left) sides of the vehicle 1.

The lighting control unit 113, which corresponds to the ECU 27 in FIG. 1, for example, controls lighting of the lighting device 140 (e.g., headlights and taillights). When the detection unit 111 detects the driver's intention to start the vehicle 1, the lighting control unit 113 according to the present embodiment causes the lighting device 140 to light in a predetermined lighting mode. The predetermined lighting mode in which the lighting device 140 lights in response to the detection of the driver's intention to start the vehicle 1 is set differently from the lighting mode (e.g., blinking cycle and luminous color) in which the lighting device 140 lights during the running (traveling) of the vehicle 1. As an example, the lighting device 140 may blink when lighting in the predetermined lighting mode. The lighting device 140, which corresponds to the lighting devices 8b in FIG. 1, includes a right-side lighting device 141 installed on the right side of the vehicle 1 and a left-side lighting device 142 installed on the left side of the vehicle 1. As described above, the lighting device 140 includes at least one pair of headlights (headlamps), width lamps (small lamps), taillights (tail lamps), and fog lamps. The lighting devices 140 may be used as daytime traveling lights that light during daytime or as nighttime traveling lights that light after sunset.

For example, the sensor group 120 may include the operation detection sensors 121 and 122, the vehicle speed sensor 123, the steering angle sensor 124, and the position sensor 125. The operation detection sensor 121, which corresponds to the operation detection sensor 7b in FIG. 1, for example, detects a driver's operation (e.g., operation amount) on the brake pedal 7B. The operation detection sensor 122, which corresponds to the operation detection sensor 7a in FIG. 1, for example, detects a driver's operation (e.g., operation amount) on the accelerator pedal 7A. The vehicle speed sensor 123, which corresponds to the vehicle speed sensor 7c in FIG. 1, for example, detects a speed of the vehicle 1. The vehicle speed sensor 123 may be interpreted as a sensor that detects an acceleration and deceleration of the vehicle 1. The steering angle sensor 124, which corresponds to the steering angle sensor 3b in FIG. 1, for example, detects a steering angle of the vehicle 1 (steering wheel 31). The position sensor 125, which corresponds to the GPS sensor 24b in FIG. 1, for example, detects a current position of the vehicle 1 (e.g., current position of vehicle 1 at intersection). The position sensor 125 may be interpreted as a sensor that detects a current orientation of the vehicle 1.

[Flow of Notification Processing]

Next, a description will be given below of a flow of notification processing performed by the processing unit 110. As described above, the notification processing is the processing of notifying the surroundings of the vehicle 1 that the vehicle 1 is starting. When detecting a driver's intention to start the vehicle 1, the processing unit 110 according to the present embodiment causes the lighting device 140 in the vehicle 1 to light in the predetermined lighting mode, thereby performing the notification processing. In the following description, the lighting device 140 blinks when lighting in the predetermined lighting mode in response to the detection of the driver's intention to start the vehicle 1. In this notification processing, the headlights (headlamps) and/or width lamps (small lamps) are used as the lighting device 140; however, the taillights (tail lamps), fog lamps, or other similar lamps may be used instead.

Figure 3:
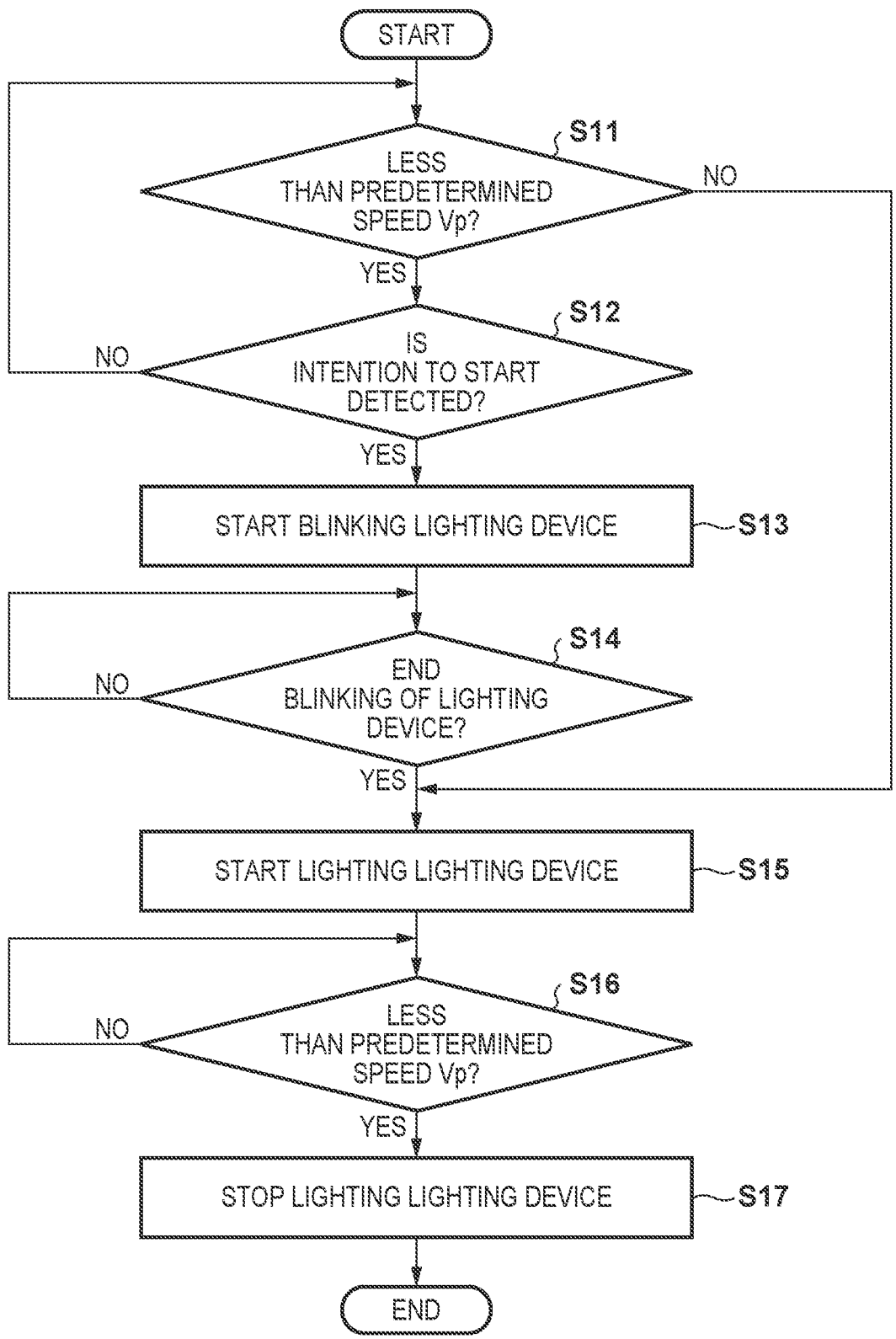
FIG. 3 is a flowchart illustrating notification processing.

FIG. 3 is a flowchart illustrating the notification processing performed by the processing unit 110. The notification processing in the flowchart of FIG. 3 starts when the vehicle 1 is in the stopped state, more specifically, when the vehicle 1 is running at less than a predetermined speed Vp. The predetermined speed Vp is a threshold at which the vehicle 1 can be recognized (determined) to be stationary. For example, the predetermined speed Vp may be set to a sufficiently slow speed, such as 3 or 5 km/h, or lower. The processing unit 110 repeatedly performs the notification processing illustrated in the flowchart in FIG. 3. After having completed Step S17, the processing unit 110 may newly start the processing from Step S11.

At Step S11, the processing unit 110 determines whether the speed of the vehicle 1 is less than the predetermined speed Vp (whether the vehicle 1 is stationary), based on the output from the vehicle speed sensor 123. When the speed of the vehicle 1 is less than the predetermined speed Vp, the processing unit 110 determines that the vehicle 1 is stationary and then the processing proceeds to Step S12. When the speed of the vehicle 1 is equal to or higher than the predetermined speed Vp, the processing proceeds to Step S15.

At Step S12, the processing unit 110 determines whether the detection unit 111 has detected a driver's intention to start the vehicle 1. For example, by detecting the end of a driver's operation on the brake pedal 7B (for example, the end of a driver's stepping on the brake pedal 7B), based on the output from the operation detection sensor 121 of the brake pedal 7B, the detection unit 111 can detect the driver's intention to start the vehicle 1. Alternatively, by detecting the start of a driver's operation on the accelerator pedal 7A (for example, the start of a driver's stepping on the accelerator pedal 7A), based on the output from the operation detection sensor 122 of the accelerator pedal 7A, the detection unit 111 may detect the driver's intention to start the vehicle 1. When the detection unit 111 has not yet detected a driver's intention to start the vehicle 1 (No at Step S12), the processing returns to Step S11. When detecting a driver's intention to start the vehicle 1 (Yes at Step S12), the processing proceeds to Step S13.

At Step S13, the processing unit 110 (lighting control unit 113) causes the lighting device 140 in the vehicle 1 to start blinking (to start lighting in the predetermined lighting mode). At Step S14, the processing unit 110 (lighting control unit 113) determines whether to finish the blinking of the lighting device 140. When a predetermined time has passed after the detection of the driver's intention to start the vehicle 1, for example, the lighting control unit 113 may determine that it is time to finish the blinking of the lighting device 140. The predetermined time may be set to any time period. For example, the predetermined time may be set to a time period, such as several seconds or a dozen seconds, that is long enough for the drivers in other vehicles and pedestrians present around the vehicle 1 to recognize that the vehicle 1 is starting. Alternatively, the lighting control unit 113 may determine that it is time to finish the blinking of the lighting device 140 when determining that the vehicle 1 has run a predetermined distance, based on the output from the position sensor 125 after the detection of the driver's intention to start the vehicle 1. The predetermined distance may be set to any distance. For example, the predetermined distance may be set to a distance, such as several meters or a dozen meters, that is long enough for the drivers in other vehicles and pedestrians present around the vehicle 1 to recognize that the vehicle 1 is starting. Furthermore, the lighting control unit 113 may determine that it is time to finish the blinking of the lighting device 140 when determining that the vehicle 1 is running at a predetermined speed or higher, based on the output from the vehicle speed sensor 123. The predetermined speed may be set to the predetermined speed Vp that has been employed in Step S11 described above or may be set differently from the predetermined speed Vp (e.g., set to a speed exceeding the predetermined speed Vp). Furthermore, in a case where the vehicle 1 that has been stationary in front of an intersection starts, the lighting control unit 113 may determine that it is time to finish the blinking of the lighting device 140 when the vehicle 1 passes through the intersection, based on the output from the position sensor 125.

Figure 4:
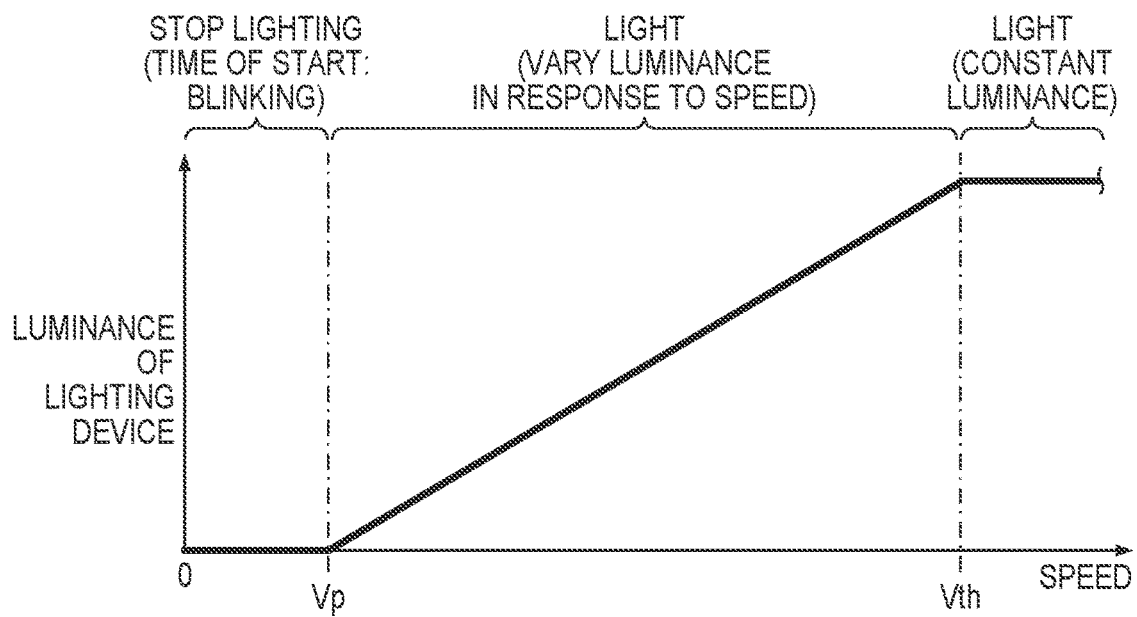
FIG. 4 is a diagram showing an example of the relationship between a vehicle speed and the luminance of a lighting device.

At Step S15, the processing unit 110 (lighting control unit 113) causes the lighting device 140 in the vehicle 1 to start lighting. If the lighting device 140 is a daytime traveling light, it should be understood that the lighting control unit 113 may increase the luminance of the lighting device 140 at Step S15. At Step S15, the lighting control unit 113 may vary the luminance of the lighting device 140 in accordance with the speed of the vehicle 1 detected by the vehicle speed sensor 123. FIG. 4 is a diagram showing an example of the relationship between the speed of the vehicle 1 and the luminance of the lighting device 140. After the lighting device 140 has blinked in response to the start of the vehicle 1 (more specifically, in response to the detection of the driver's intention to start the vehicle 1), the lighting control unit 113 varies the luminance of the lighting device 140 in accordance with the speed of vehicle 1, so that the lighting device 140 lights at a luminance proportional to the speed of the vehicle 1. When the speed of the vehicle 1 exceeds the threshold speed Vth, the lighting control unit 113 maintains the lighting device 140 at a constant luminance. Controlling the luminance of the lighting device 140 in this manner makes it possible to notify the surroundings of the vehicle 1 of the current speed of the vehicle 1.

At Step S16, the processing unit 110 determines whether the speed of the vehicle 1 is less than the predetermined speed Vp (whether vehicle 1 has stopped), based on the output from the vehicle speed sensor 123. When the speed of the vehicle 1 is equal to or higher than the predetermined speed Vp (No at Step S16), the processing unit 110 determines that the vehicle 1 has not yet stopped and repeats Step S16. When the speed of the vehicle 1 is less than the predetermined speed Vp (Yes at Step S16), the processing proceeds to Step S17. At Step S17, the processing unit 110 (lighting control unit 113) causes the lighting device 140 to stop lighting. If the lighting device 140 is a daytime traveling light, it should be understood that the lighting control unit 113 may decrease the luminance of the lighting device 140 at Step S17.

According to the present embodiment, as described above, when detecting a driver's intention to start the vehicle 1, the notification device 100 causes the lighting device 140 in the vehicle 1 to light in the predetermined lighting mode, thereby notifying the surroundings of the vehicle 1 that the vehicle 1 is starting. This notification processing can be advantageous in terms of both safety and vehicle cost because it is possible to notify the surroundings of the vehicle 1 that the vehicle 1 is starting with a simple configuration and without involving additional devices to be mounted on the vehicle 1.

Second Embodiment

A second embodiment will be described regarding a case where a lighting device 140 blinks (lights in a predetermined lighting mode) when a vehicle 1 starts to turn right or left. When the vehicle 1 turns right or left, one of direction indicators 130 usually blink. In this case, if both the right and left ones (right-side lighting device 141 and left-side lighting device 142) of the lighting device 140 blink, the surroundings (e.g., drivers in other vehicles and pedestrians) of the vehicle 1 may have trouble in perceiving the blinking of the direction indicator 130 due to the influence of the luminance of the lighting device 140. For this reason, when one of the direction indicators 130 installed on the right and left sides is lighting (blinking), a notification device 100 (lighting control unit 113) according to the present embodiment causes, of the right-side lighting device 141 and the left-side lighting device 142, one positioned on the side opposite to the lighting direction indicator to blink, thereby notifying the surroundings of the vehicle 1 that vehicle 1 is starting. As a result, it is possible to reduce the difficulty of perceiving the blinking of the direction indicator 130 in the surroundings of the vehicle 1.

Figure 5:
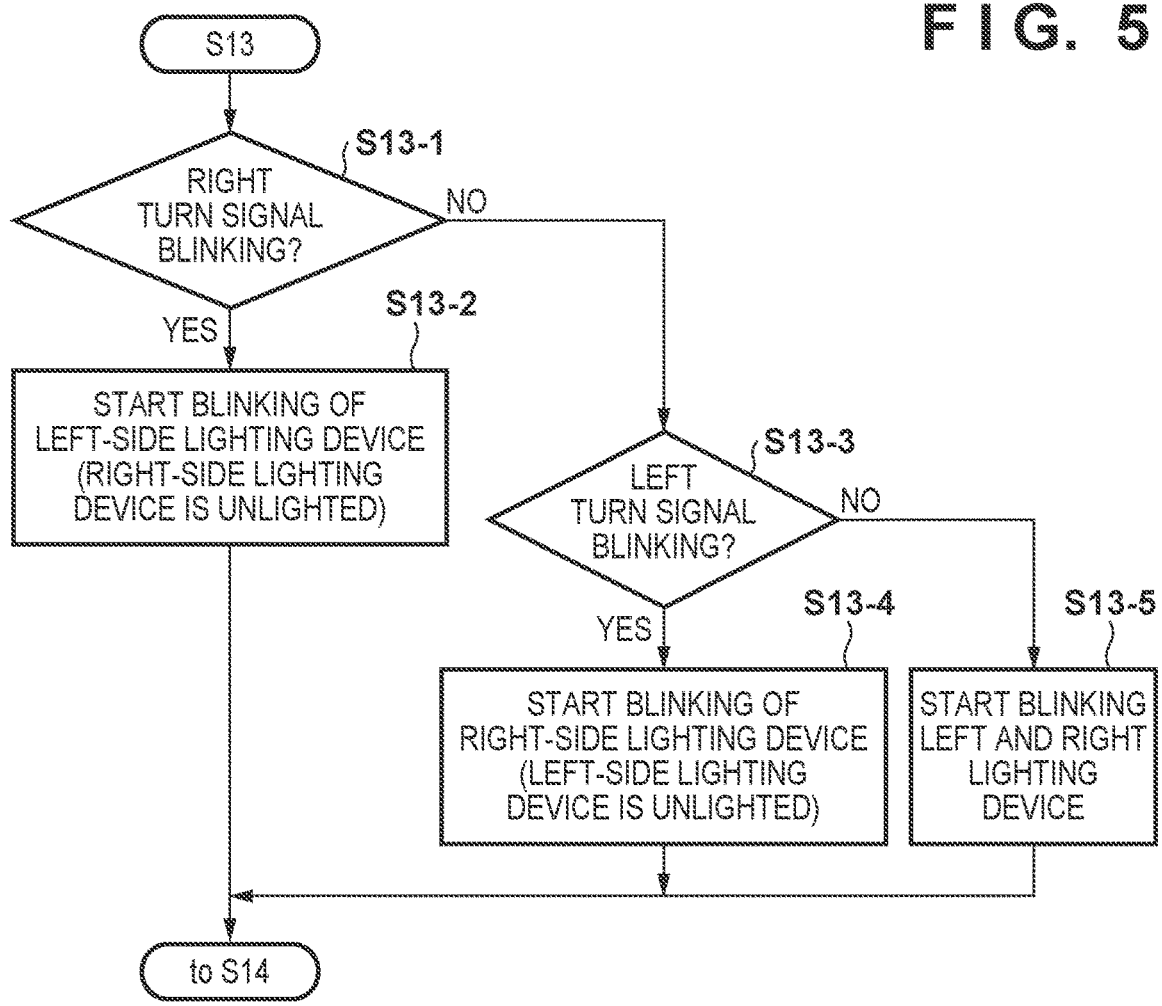
FIG. 5 is a flowchart of an example of processing performed at Step S13 in FIG. 3.
Figure 6A:
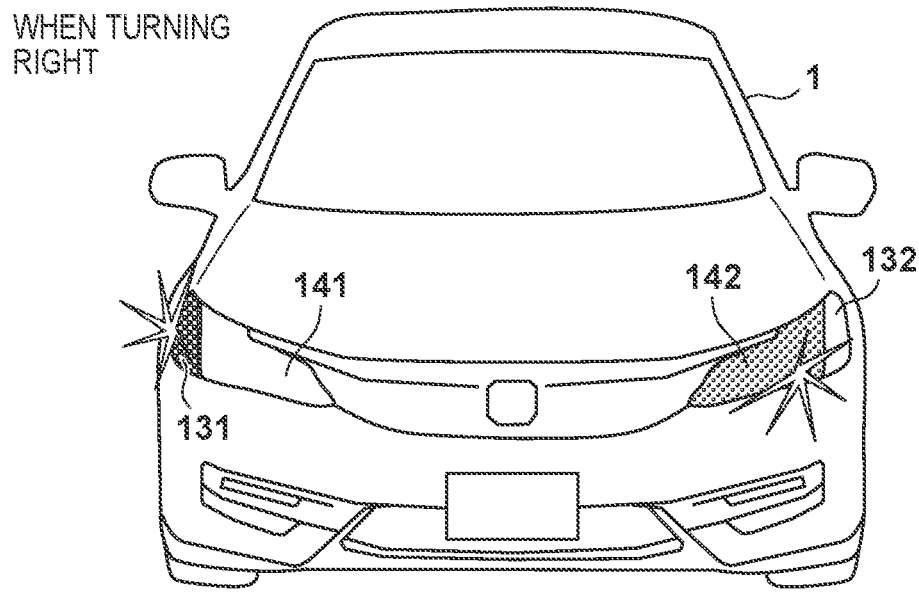
FIGS. 6A and 6B are diagrams for describing blinking of a lighting device when a vehicle is started to turn right or left.
Figure 6B:
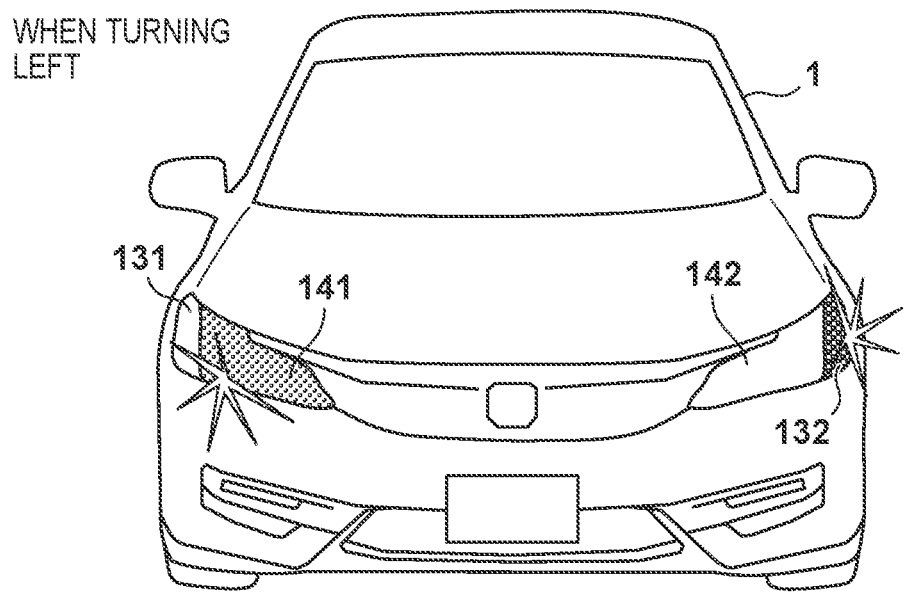

FIG. 5 is a flowchart of an example of processing performed at Step S13, described above, in FIG. 3. FIGS. 6A and 6B are diagrams in which the vehicle 1 causes the lighting device 140 to blink when starting to turn right or left, respectively. Each of FIGS. 6A and 6B illustrates the vehicle 1 as viewed from the front: FIG. 6A illustrates the vehicle 1 that is turning right; and FIG. 6B illustrates the vehicle 1 that is turning left. As illustrated in FIGS. 6A and 6B, the direction indicators 130 may include: a direction indicator 131 installed on the right side of the vehicle 1; and a direction indicator 132 installed on the left side of the vehicle 1. The direction indicator 131 is used to notify the surroundings of the vehicle 1 that the vehicle 1 is turning right, whereas the direction indicator 132 is used to notify the surroundings of the vehicle 1 that the vehicle 1 is turning left. Hereinafter, the direction indicator 131 is sometimes referred to as the right turn signal 131, and the direction indicator 132 is sometimes referred to as the left turn signal 132.

At Step S13-1, the processing unit 110 (determination unit 112) determines whether the right turn signal 131 is blinking (lighting). When the right turn signal 131 is blinking (Yes at Step S13-1), the processing proceeds to Step S13-2, at which the processing unit 110 (lighting control unit 113) causes the left-side lighting device 142 positioned on the side opposite to the right turn signal 131 to start blinking (to start lighting in a predetermined lighting mode), as illustrated in FIG. 6A. In this case, the lighting control unit 113 maintains the right-side lighting device 141 in an unlighted state (i.e. turns off the right-side lighting device 141). When the right turn signal 131 is not blinking (No at Step S13-1), the processing proceeds to Step S13-3.

At Step S13-3, the processing unit 110 (determination unit 112) determines whether the left turn signal 132 is blinking (lighting). When the left turn signal 132 is blinking (Yes at Step S13-3), the processing proceeds to Step S13-4, at which the processing unit 110 (lighting control unit 113) causes the right-side lighting device 141 positioned on the side opposite to the left turn signal 132 to start blinking (to start lighting in the predetermined lighting mode), as illustrated in FIG. 6B. In this case, the lighting control unit 113 maintains the left-side lighting device 142 in the unlighted state (i.e. turns off the left-side lighting device 142). When the left turn signal 132 is not blinking (No at Step S13-3), the processing proceeds to Step S13-5. At Step S13-5, the processing unit 110 (lighting control unit 113) causes both the right and left ones (right-side lighting device 141 and left-side lighting device 142) of the lighting device 140 to start blinking.

In the present embodiment, an example has been described in which a lighting device to be blinked for notifying the surroundings of the start of the vehicle 1 is selected from the right-side lighting device 141 and the left-side lighting device 142 on the basis of the lighting state of the direction indicator 130 (right turn signal 131, left turn signal 132), but the present invention is not limited thereto. Alternatively, the processing unit 110 (lighting control unit 113) may cause the right-side lighting device 141 or the left-side lighting device 142 to selectively blink, depending on to which side (right, left, or back) the vehicle 1 is turning, independently of lighting states of the direction indicators 130. When the determination unit 112 determines that the vehicle 1 is turning right or left at an intersection, for example, the lighting control unit 113 may cause, of the right-side lighting device 141 and the left-side lighting device 142, one positioned on the side opposite to the side (right or left side) to which the vehicle 1 is turning to blink in response to the start of the vehicle 1. When detecting that the vehicle 1 is positioned in a right or left turn lane at an intersection, based on the output from the position sensor 125, the determination unit 112 can determine that the vehicle 1 is turning right or left. Alternatively, when detecting that a steering angle of the vehicle 1 (steering wheel 31) is equal to or more than a predetermined angle, based on the output from the steering angle sensor 124, the determination unit 112 can determine that the vehicle 1 is turning right or left.

Other Embodiments

In the foregoing embodiments, at Step S15, the processing unit 110 (lighting control unit 113) varies the luminance of the lighting device 140 in accordance with the speed of the vehicle 1; however, the present invention is not limited to this example configuration. As an alternative example, the processing unit 110 (lighting control unit 113) may vary the luminance of the lighting device 140 in accordance with an operation amount (depression amount) of the brake pedal 7B detected by the operation detection sensor 121. As another alternative example, the processing unit 110 (lighting control unit 113) may vary the luminance of the lighting device 140 in accordance with the operation amount (depression amount) of the accelerator pedal 7A detected by the operation detection sensor 122. As further another alternative example, the processing unit 110 (lighting control unit 113) may vary the luminance of the lighting device 140 in accordance with the acceleration or deceleration amount of the vehicle 1 detected by the vehicle speed sensor 123. Controlling the luminance of the lighting device 140 in this manner makes it possible to notify the surroundings of the vehicle 1 of its current acceleration or deceleration.

Summary of Embodiments

1. The notification apparatus according to the above embodiment is:
a notification apparatus (for example, 100) that is mounted on a vehicle (for example, 1) and notifies surroundings of the vehicle that the vehicle is starting, the notification apparatus comprising:
a detector (for example, 111) configured to detect a driver's intention to start the vehicle; and
a lighting controller (for example, 113) configured to cause, when the detector detects the driver's intention to start the vehicle, a lighting device (for example, 140 to 142) in the vehicle to light in a predetermined lighting mode.

According to this embodiment, a notification device can be advantageous in terms of both safety and vehicle cost because it is possible to notify the surroundings of a vehicle that the vehicle is starting with a simple configuration and without involving additional devices to be mounted on the vehicle.

2. In the above embodiment,
the predetermined lighting mode differs from a lighting mode in which the lighting device lights during running of the vehicle.

According to this embodiment, it is possible to clearly notify the surroundings of a vehicle that the vehicle is starting.

3. In the above embodiment, the lighting controller is configured to cause the lighting device to blink in the predetermined lighting mode.

According to this embodiment, it is possible to clearly notify the surroundings of a vehicle that the vehicle is starting.

4. In the above embodiment,
the lighting device for causing to light in the predetermined lighting mode includes at least one of a headlight and a width lamp in the vehicle.

According to this embodiment, it is possible to notify the front of a vehicle that the vehicle is starting.

5. In the above embodiment,
the lighting device for causing to light in the predetermined lighting mode includes a taillight in the vehicle.

According to this embodiment, it is possible to notify the rear of a vehicle that the vehicle is starting.

6. In the above embodiment,
the vehicle includes a right-side lighting device (for example, 141) installed on a right side of the vehicle and a left-side lighting device (for example, 142) installed on a left side of the vehicle, and
in a case where one of direction indicators (for example, 130 to 132) on a right and left side of the vehicle is lighting, the lighting controller is configured to cause, among the right-side lighting device and the left-side lighting device, one positioned on a side opposite to the lighting direction indicator to light in the predetermined lighting mode, so as to notify the surroundings of the vehicle that the vehicle is starting.

According to this embodiment, it is possible to reduce the difficulty of perceiving the blinking of a direction indicator in the surroundings (e.g., drivers in other vehicles and pedestrians) of a vehicle due to an influence of luminance of a lighting device.

7. In the above embodiment,
in a case where one of the direction indicators on the right and left side is lighting, the lighting controller is configured to turn off, among the right-side lighting device and the left-side lighting device, one positioned on the same side as the lighting direction indicator.

According to this embodiment, it is possible to reduce the difficulty of perceiving the blinking of a direction indicator in the surroundings (e.g., drivers in other vehicles and pedestrians) of a vehicle due to an influence of luminance of a lighting device.

8. In the above embodiment,
the vehicle includes a right-side lighting device (for example, 141) installed on a right side of the vehicle and a left-side lighting device (for example, 142) installed on a left side of the vehicle, and
the lighting controller is configured to cause, among the right-side lighting device and the left-side lighting device, one positioned on a side opposite to a side to which the vehicle is turning to light in the predetermined lighting mode, so as to notify the surroundings of the vehicle that the vehicle is starting.

According to this embodiment, it is possible, even when the vehicle turns right, left, or around, to appropriately notify the surroundings of a vehicle that the vehicle is starting.

9. In the above embodiment,
the detector is configured to detect an end of a driver's operation on a brake pedal (for example, 7B), as the driver's intention to start the vehicle.

According to this embodiment, it is possible to accurately and quickly detect (grasp) a driver's intention to start a vehicle.

10. In the above embodiment,
the detector is configured to detect starting of a driver's operation on an accelerator pedal (for example, 7A), as the driver's intention to start the vehicle.

According to this embodiment, it is possible to accurately and quickly detect (grasp) a driver's intention to start a vehicle.

The invention is not limited to the foregoing embodiments, and various variations/changes are possible within the spirit of the invention.

What is claimed is:

1. A notification apparatus that is mounted on a vehicle and notifies surroundings of the vehicle that the vehicle is starting, the notification apparatus comprising:
a detector configured to detect a driver's intention to start the vehicle; and
a lighting controller configured to control lighting of a lighting device in the vehicle,
wherein the lighting device includes a right-side headlight installed on a right side of the vehicle, and a left-side headlight installed on a left side of the vehicle,
wherein in a case where one of a right-side direction indicator and a left-side direction indicator of the vehicle is lighted and the detector detects the driver's intention, the lighting controller is configured to light, among the right-side headlight and the left-side headlight, one positioned on a side opposite to a lighted direction indicator in a predetermined lighting mode.

2. The notification apparatus according to claim 1, wherein the predetermined lighting mode differs from a lighting mode in which the lighting device lights during running of the vehicle.

3. The notification apparatus according to claim 1, wherein the lighting controller is configured to cause the lighting device to blink in the predetermined lighting mode.

4. The notification apparatus according to claim 1, wherein
the lighting device includes a right-side taillight installed on a right side of the vehicle and a left-side taillight installed on a left side of the vehicle, and
in a case where one of the right-side direction indicator and the left-side direction indicator is lighted and the detector detects the driver's intention, the lighting controller is configured to light, among the right-side taillight and the left-side taillight, one positioned on a side opposite to a lighted direction indicator in the predetermined lighting mode.

5. The notification apparatus according to claim 4, wherein in a case where one of the right-side direction indicator and the left-side direction indicator is lighting is lighted and the detector detects the driver's intention, the lighting controller is configured to turn off, among the right-side taillight and the left-side taillight, one positioned on the same side as the lighted direction indicator.

6. The notification apparatus according to claim 1, wherein
the lighting controller is configured to light, among the right-side headlight and the left-side headlight, one positioned on a side opposite to a side to which the vehicle is turning in the predetermined lighting mode.

7. The notification apparatus according to claim 1, wherein the detector is configured to detect an end of a driver's operation on a brake pedal, as the driver's intention to start the vehicle.

8. The notification apparatus according to claim 1, wherein the detector is configured to detect starting of a driver's operation on an accelerator pedal, as the driver's intention to start the vehicle.

9. A vehicle comprising the notification apparatus according to claim 1.

10. The notification apparatus according to claim 1, wherein in a case where one of the right-side direction indicator and the left-side direction indicator is lighted and the detector detects the driver's intention, the lighting controller is configured to turn off, among the right-side headlight and the left-side headlight, one positioned on the same side as the lighted direction indicator.

11. The notification apparatus according to claim 1, wherein
the lighting device includes a right-side width lamp installed on a right side of the vehicle and a left-side width lamp installed on a left side of the vehicle, and
in a case where one of the right-side direction indicator and the left-side direction indicator is lighted and the detector detects the driver's intention, the lighting controller is configured to light, among the right-side width lamp and the left-side width lamp, one positioned on a side opposite to the lighted direction indicator in the predetermined lighting mode.

12. The notification apparatus according to claim 1, further comprising a speed sensor configured to detect a speed of the vehicle,
wherein the lighting controller is configured to control luminance of the right-side headlight and the left-side headlight in accordance with the speed of the vehicle detected by the speed sensor, so that the luminance increases as the speed of the vehicle increases, after one positioned on a side opposite to a lighted direction indicator among the right-side headlight and the left-side headlight has been lighted in a predetermined lighting mode.

13. A notification method for notifying surroundings of a vehicle that the vehicle is starting, the notification method comprising:
detecting a driver's intention to start the vehicle; and
controlling lighting of a lighting device in the vehicle,
wherein the lighting device includes a right-side headlight installed on a right side of the vehicle, and a left-side headlight installed on a left side of the vehicle,
wherein in the controlling, in a case where one of a right-side direction indicator and a left-side direction indicator of the vehicle is lighted and the detector detects the driver's intention, one positioned on a side opposite to a lighted direction indicator among the right-side headlight and the left-side headlight is lighted in a predetermined lighting mode.

14. A non-transitory computer-readable storage medium storing a program for causing a computer to execute a notification method according to claim 13.

* * * * *